(12) United States Patent
Byun et al.

(10) Patent No.: US 10,437,096 B2
(45) Date of Patent: Oct. 8, 2019

(54) METHOD OF MANUFACTURING POLARIZING PLATE AND DISPLAY DEVICE INCLUDING POLARIZING PLATE

(71) Applicant: Samsung Display Co., Ltd., Yongin-si (KR)

(72) Inventors: Ho Yun Byun, Yongin-si (KR); Hak Sun Kim, Yongin-si (KR); Nam Seok Roh, Yongin-si (KR); Seung Beom Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 15/831,179

(22) Filed: Dec. 4, 2017

(65) Prior Publication Data

US 2018/0186109 A1 Jul. 5, 2018

(30) Foreign Application Priority Data

Jan. 5, 2017 (KR) .................. 10-2017-0001858

(51) Int. Cl.
*G02F 1/1335* (2006.01)
*G02B 5/30* (2006.01)
*B29D 11/00* (2006.01)

(52) U.S. Cl.
CPC .. *G02F 1/133528* (2013.01); *B29D 11/00644* (2013.01); *G02B 5/30* (2013.01); *G02B 5/3025* (2013.01); *G02B 5/3033* (2013.01); *G02F 2001/133538* (2013.01); *G02F 2202/28* (2013.01); *G02F 2203/01* (2013.01)

(58) Field of Classification Search
CPC .... G02B 5/3033; G02B 5/3025; G02B 27/26; Y10T 428/1041; G02F 1/133528; G02F 1/13362
See application file for complete search history.

(56) References Cited

U.S. PATENT DOCUMENTS

| | | | |
|---|---|---|---|
| 7,674,518 B2 | 3/2010 | Hayakawa et al. | |
| 7,929,079 B2* | 4/2011 | Choo | G02F 1/133528 349/96 |
| 8,817,373 B2 | 8/2014 | Kobayashi et al. | |
| 8,836,889 B2 | 9/2014 | Park et al. | |
| 9,019,250 B2 | 4/2015 | Lee et al. | |
| 9,054,479 B2 | 6/2015 | Karavitis | |
| 9,709,812 B2 | 7/2017 | Park | |
| 2006/0256260 A1* | 11/2006 | Gon | G02B 5/3058 349/96 |

(Continued)

FOREIGN PATENT DOCUMENTS

JP 2014-164085 9/2014
KR 10-1037437 5/2011

(Continued)

*Primary Examiner* — Jia X Pan
(74) *Attorney, Agent, or Firm* — H.C. Park & Associates, PLC (57) ABSTRACT

A method of manufacturing a polarizing plate includes: preparing a polarizer including a dichroic material, the polarizer being configured to polarize incident light; forming a protective film on at least one surface of the polarizer; and forming at least one transmission region by selectively radiating a femtosecond laser onto the polarizer, a group transmittance of the at least one transmission region being 80% or more.

13 Claims, 8 Drawing Sheets

(56) References Cited

U.S. PATENT DOCUMENTS

| | | | |
|---|---|---|---|
| 2007/0229733 A1* | 10/2007 | Suh | G02F 1/1339 349/96 |
| 2014/0175684 A1 | 6/2014 | Hassan | |
| 2016/0195767 A1 | 7/2016 | Lee et al. | |
| 2017/0120389 A1 | 5/2017 | Lee et al. | |
| 2017/0254939 A1 | 9/2017 | Lee et al. | |

FOREIGN PATENT DOCUMENTS

| | | |
|---|---|---|
| KR | 10-1131101 | 4/2012 |
| KR | 10-1157444 | 6/2012 |
| KR | 10-2012-0128452 | 11/2012 |
| KR | 10-1212527 | 12/2012 |
| KR | 10-2013-0002839 | 1/2013 |
| KR | 10-2013-0003000 | 1/2013 |
| KR | 10-1220737 | 1/2013 |
| KR | 10-1266880 | 5/2013 |
| KR | 10-1273170 | 6/2013 |
| KR | 10-2014-0024572 | 3/2014 |
| KR | 10-2014-0081677 | 7/2014 |
| KR | 10-2015-0037550 | 4/2015 |
| KR | 10-1606331 | 3/2016 |
| KR | 10-2016-0038272 | 4/2016 |
| KR | 10-1605034 | 4/2016 |
| KR | 10-1605037 | 4/2016 |
| KR | 10-1607964 | 4/2016 |
| KR | 10-1686698 | 12/2016 |
| KR | 10-1706416 | 2/2017 |
| KR | 10-1706863 | 2/2017 |

\* cited by examiner

METHOD OF MANUFACTURING POLARIZING PLATE AND DISPLAY DEVICE INCLUDING POLARIZING PLATE

CROSS-REFERENCE TO RELATED APPLICATION

The application claims priority from and the benefit of Korean Patent Application No. 10-2017-0001858, filed Jan. 5, 2017, which is hereby incorporated by reference for all purposes as if fully set forth herein.

BACKGROUND

Field

Exemplary embodiments relate to a method of manufacturing a polarizing plate capable of improving visibility and a display device including the polarizing plate.

Discussion

Liquid crystal displays (LCDs) that display images using electro-optical characteristics of liquid crystals have excellent color reproduction and low power consumption. In addition, LCDs can be manufactured to be thin. Thus, the LCDs are widely used in consumer electronics, such as, for example, televisions, personal computers, potable terminals, and the like. As the use of LCDs increases, improvement of luminance and visibility remains steadfast. Improving optical characteristics of a polarizing plate used in an LCD is one method to improve the luminance and visibility. However, improving optical characteristics of a polarizing plate should be weighed against degrading the performance of the polarizing effect of the polarizing plate.

The above information disclosed in this section is only for understanding the background of the inventive concepts, and, therefore, may contain information that does not form prior art.

SUMMARY

One or more exemplary embodiments provide a method for manufacturing a polarizing plate capable of improving visibility.

One or more exemplary embodiments also provide a method for manufacturing a polarizing plate capable of reducing occurrence of a failure.

One or more exemplary embodiments are capable of providing a polarizing plate with improved visibility.

Additional aspects will be set forth in the detailed description which follows, and, in part, will be apparent from the disclosure, or may be learned by practice of the inventive concepts.

According to some exemplary embodiments, a method of manufacturing a polarizing plate includes:
 preparing a polarizer including a dichroic material, the polarizer being configured to polarize incident light;
 forming a protective film on at least one surface of the polarizer; and
 forming at least one transmission region by selectively radiating a femtosecond laser onto the polarizer, a group transmittance of the at least one transmission region being 80% or more.

The dichroic material may include at least one of iodine and an organic dye.

Preparing the polarizer may include:
 preparing a polyvinyl alcohol-based resin film;
 preparing a polyvinyl alcohol-based resin film; and
 arranging iodine molecules and organic dye molecules in the stretching direction of the resin film by immersing the resin film in at least one solution including the iodine and the organic dye.

The protective film may include triacetyl cellulose.

A pulse width of the femtosecond laser may be 100 femtoseconds to 500 femtoseconds. A wavelength of the femtosecond laser may be 350 nm to 600 nm.

The femtosecond laser may be radiated using a frequency of 100 KHz to 200 KHz and a power of 1 W or less.

The femtosecond laser may be radiated one to ten times in the at least one transmission region.

A group transmittance of polarization regions of the polarizer excluding the at least one transmission region may be 40% to 45%.

The method may further include forming a barrier film on the protective film.

A water vapor transmission rate of the barrier film may be $10^{-2}$ g/m$^2$ per day or less. A transmittance of the barrier film may be 90% or more.

The method may further include:
 forming a surface treatment film on the protective film; and
 forming a barrier film on the surface treatment film.

The surface treatment film may include an acryl-based resin.

A water vapor transmission rate of the barrier film may be $10^{-2}$ g/m$^2$ per day or less. A transmittance of the barrier film may be 90% or more.

According to some exemplary embodiments, a display device includes a polarizing plate, a liquid crystal display panel, and a backlight. The polarizing plate includes at least one transmission region with a group transmittance of 80% or more. The liquid crystal display panel is disposed on the polarizing plate. The backlight provides light to the liquid crystal display panel. The backlight is disposed on the liquid crystal display panel.

The liquid crystal display panel may include a plurality of pixels. The at least one transmission region of the polarizing plate may overlap at least some of the plurality of pixels.

The display device may further include an adhesive film disposed between the polarizing plate and the liquid crystal display panel.

The at least one transmission region of the polarizing plate may overlap with 10% to 90% of a display region of each pixel among the plurality of pixels.

A group transmittance of polarization regions of the polarizing plate excluding the at least one transmission region may be 40% to 45%.

The at least one transmission region may have a line shape.

The at least one transmission region may have a dot shape.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIGS. 1A to 1D are sectional views of a polarizing plate at various stages of manufacture according to one or more exemplary embodiments. FIG. 2 is a flowchart illustrating a process of preparing a polarizer according to one or more exemplary embodiments.

Figure 1A:
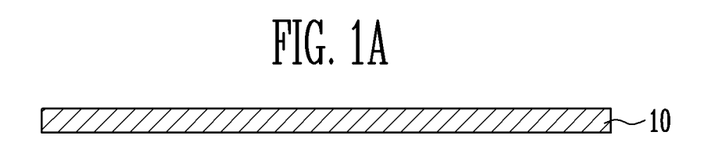
FIGS. 1A, 1B, 1C, and 1D are sectional views of a polarizing plate at various stages of manufacture according to one or more exemplary embodiments.
Figure 2:
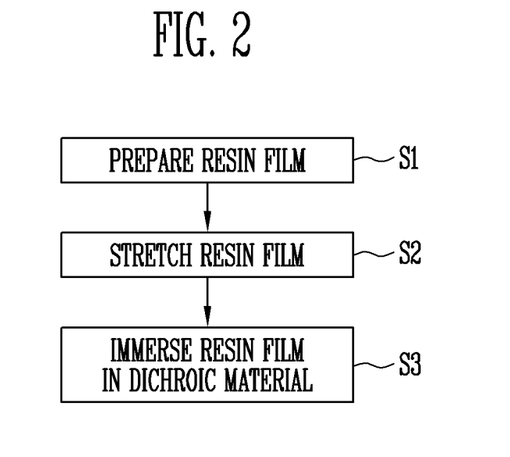
FIG. 2 is a flowchart illustrating a process of preparing a polarizer according to one or more exemplary embodiments.

Referring to FIG. 1A, a polarizer 10 that polarizes incident light is prepared. The polarizer 10 includes a dichroic material. The dichroic material may include at least one of iodine and an organic dye. For example, the organic dye may include at least one of an azo-based pigment, a stilbene-based pigment, a pyrazolone-based pigment, a triphenyl-methane-based pigment, a quinoline-based pigment, an oxazine-based pigment, a thiazine-based pigment, an anthraquinone-based pigment, and the like.

Referring to FIG. 2, the polarizer 10 may be manufactured, for example, through a step S1 of preparing a polyvinyl alcohol (PVA)-based resin film, a step S2 of stretching the resin film, and a step S3 of immersing the stretched resin film in a dichroic material. For example, the step S3 may be a step of arranging iodine molecules and dye molecules in a stretching direction of the resin film by immersing the resin film in the iodine and organic dye. The stretching is performed to stretch the resin film in one direction or both directions in, for example, a plane, and the resin film may have optical anisotropy through the stretching process. Optical characteristics of polarizer 10 may be determined according to the stretching direction(s) and the degree of stretching of the resin film.

The polarizer 10 manufactured as described above has a transmission axis in a direction vertical to the stretching direction. For instance, since the iodine molecules and the dye molecules exhibit dichroic properties, the polarizer 10 has a function of absorbing light vibrating in the stretching direction and allowing light vibrating in the vertical direction to be transmitted therethrough.

PVA-based resin is a material that has excellent polarization characteristics or durability and high color uniformity, and may include, for example, polyvinyl alcohol, ethylene-vinyl alcohol copolymer, and the like.

Although FIG. 2 illustrates an exemplary embodiment of a process of preparing the polarizer 10, exemplary embodiments are not limited thereto. For instance, any polarizer may be applied as one or more exemplary embodiments as long as it can be prepared using a dichroic material to each have a transmission axis in one direction.

Figure 1B:
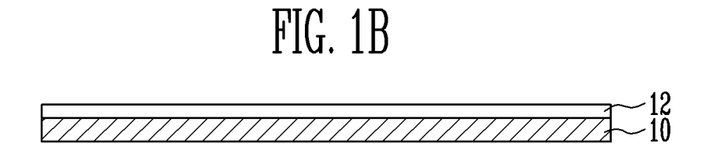
Figure 1C:
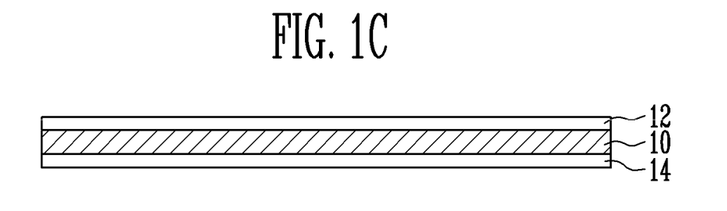

Referring to FIGS. 1B and 1C, a protective film 12 is formed on at least one surface of the polarizer 10.

As shown in FIG. 1B, a protective film 12 may be formed on only one surface of the polarizer 10. Alternatively, as shown in FIG. 1C, protective films 12 and 14 may be formed on both surfaces of the polarizer 10, respectively.

The polarizer 10 has weak mechanical strength in the direction of a transmission axis, and is shrunk or has a deteriorated polarization function due to heat or moisture. The protective films 12 and 14 do not change characteristics of light transmitted through the polarizer 10, but protect the polarizer 10. For example, the protective films 12 and 14 may be formed using triacetyl cellulose (TAC). Since TAC has high light transmittance, relatively low birefringence, and easy hydrophilicity by surface modification, TAC is easily laminated with the polarizer 10. In one or more exemplary embodiments, the protective films 12 and 14 are formed using TAC; however, exemplary embodiments are not limited thereto. For instance, a protective film may include any and all materials that satisfy the above-described conditions.

Figure 1D:
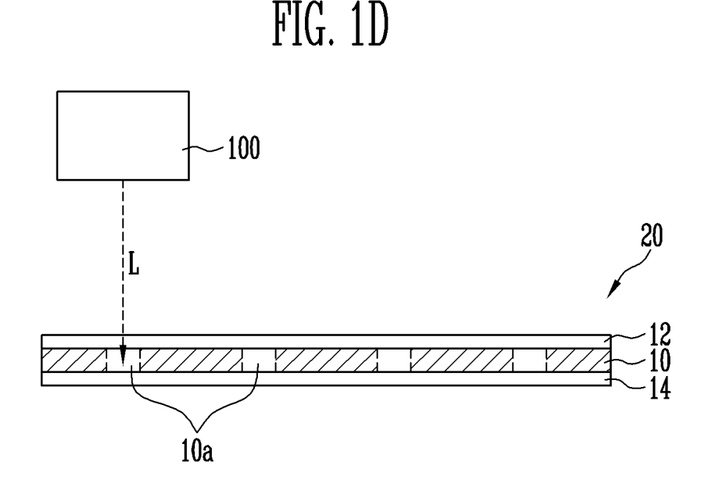

Referring to FIG. 1D, a transmission region 10a is formed by selectively radiating a femtosecond laser L onto the polarizer 10 using a laser radiation apparatus 100 to form a polarizing plate 20. Exemplary polarizing plates 20 and 20_1 are described in more detail in association with FIGS. 3A and 3B.

Figure 3A:
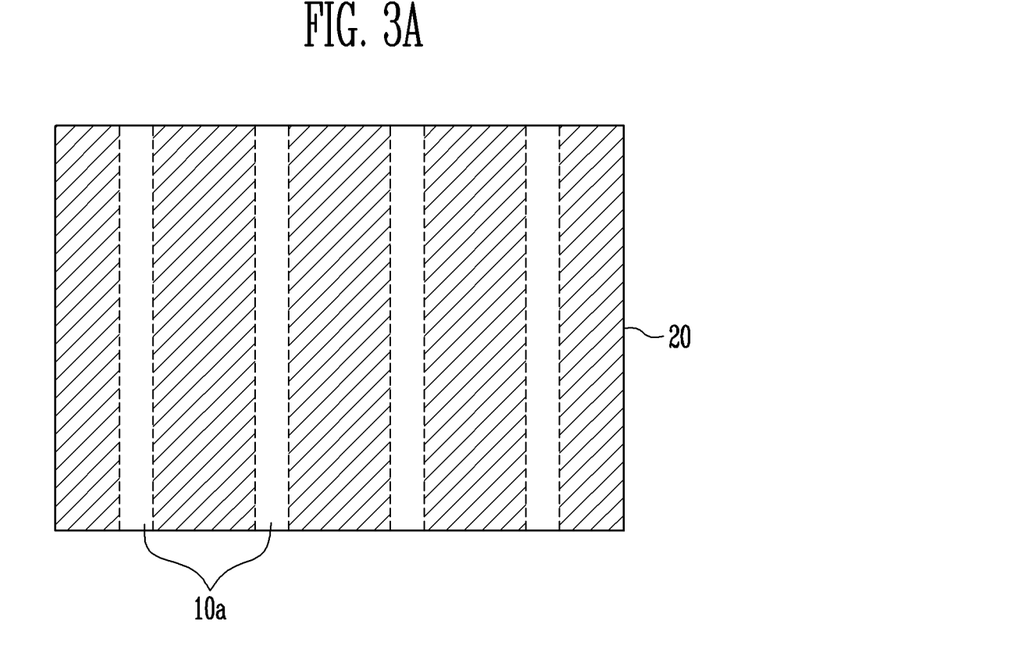
FIGS. 3A and 3B are plan views illustrating polarizing plates according to one or more exemplary embodiments.
Figure 3B:
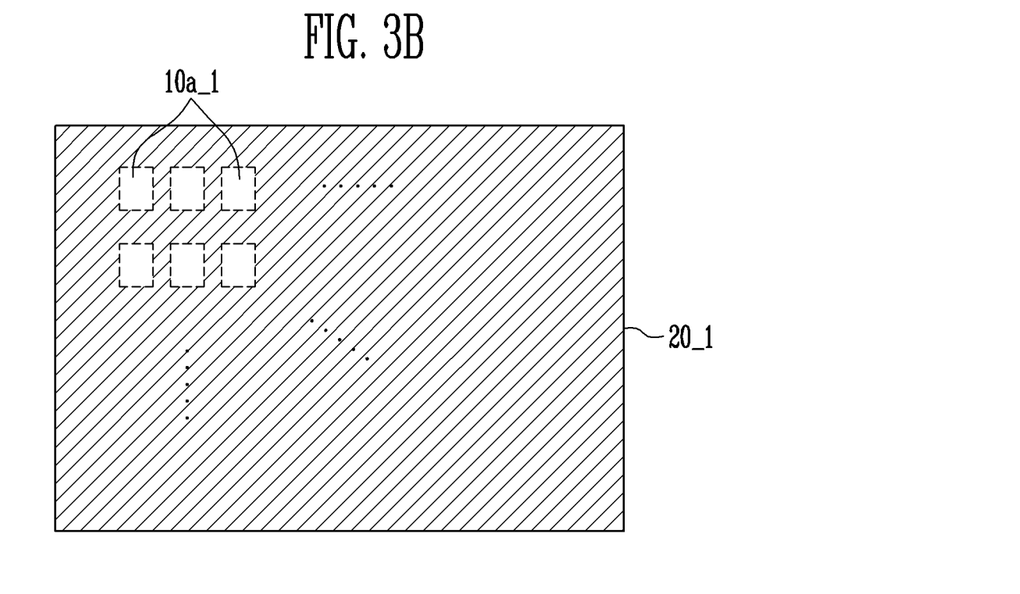

FIGS. 3A and 3B are plan views illustrating polarizing plates according to one or more exemplary embodiments.

If the femtosecond laser L is selectively radiated while moving a laser radiation apparatus 100 in a determined direction with respect to the polarizer 10, the transmission region 10a having a line shape may be formed as shown in FIG. 3A to form polarizing plate 20. In some exemplary embodiments, the femtosecond laser L may be selectively radiated while moving the laser radiation apparatus 100 to form a transmission region 10a_1 having a dot shape as shown in FIG. 3B to form polarizing plate 20_1. The shape, however, of the transmission region 10a or 10a_1 is not limited to the aforementioned examples, and the transmission region 10a or 10a_1 may be implemented in various shapes by changing the shape of the femtosecond laser L, an radiating method, and/or the like.

The femtosecond laser L may, in some exemplary embodiments, have a pulse width of 100 femtoseconds (fs) to 500 femtoseconds (fs), and a wavelength of 350 nm to 600 nm. For example, the femtosecond laser L may have a green wavelength of 500 nm to 600 nm, or so. It is recognized that it is difficult to generate a femtosecond laser of 100 femtoseconds (fs) or less. If a femtosecond laser of 500 femtoseconds (fs) or more is used, the protective film 12 or 14 is easily melted, and, therefore, a failure may occur. Hence, it may be difficult to decompose the iodine or organic dye.

In addition, the femtosecond laser L is may, in some exemplary embodiments, be radiated using a frequency of 100 KHz to 200 KHz, and a power of 1 W or less. To this end, the femtosecond laser L may be radiated one to ten times or so. When the power of the femtosecond laser L is increased to 1 W or more, the protective film 12 or 14 may be easily melted, and, hence, it may be difficult to decompose the iodine or organic dye.

If the femtosecond laser L is radiated onto the polarizer 10 according to the above-described conditions, the iodine and/or organic dye included in the polarizer 10 can be decomposed such that the transmission region 10a having a group transmittance of 80% or more can be formed.

Figure 4A:
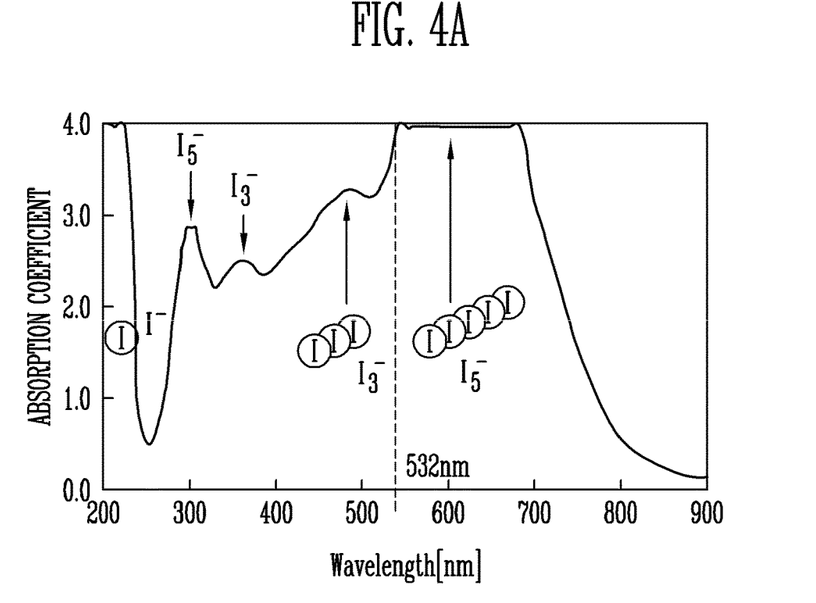
FIG. 4A is a graph illustrating changes in absorption coefficient of iodine ions with respect to wavelengths according to one or more exemplary embodiments.

FIG. 4A is a graph illustrating changes in absorption coefficient of iodine ions with respect to wavelengths according to one or more exemplary embodiments. The x-axis of the FIG. 4A shows a wavelength of a laser and the y-axis shows the absorption coefficient of the iodine and iodine complexes included in the polarizer 10.

Referring to FIG. 4A, iodine and iodine complexes included in the polarizer 10, for example, $I_3^-$ ions and $I_5^-$ ions, exhibit a maximum absorption coefficient in a wavelength range of about 350 nm to about 600 nm. It can be seen that, in a wavelength range of 350 nm or less, the absorption coefficient of $I_5^-$ ions is very low and the absorption coefficient of $I_3^-$ ions is also decreased. In addition, it can be seen that, in a wavelength range of 600 nm or more, the absorption coefficient of $I_5^-$ ions is very low and the absorption coefficient of $I_3^-$ ions is also decreased.

Figure 4B:
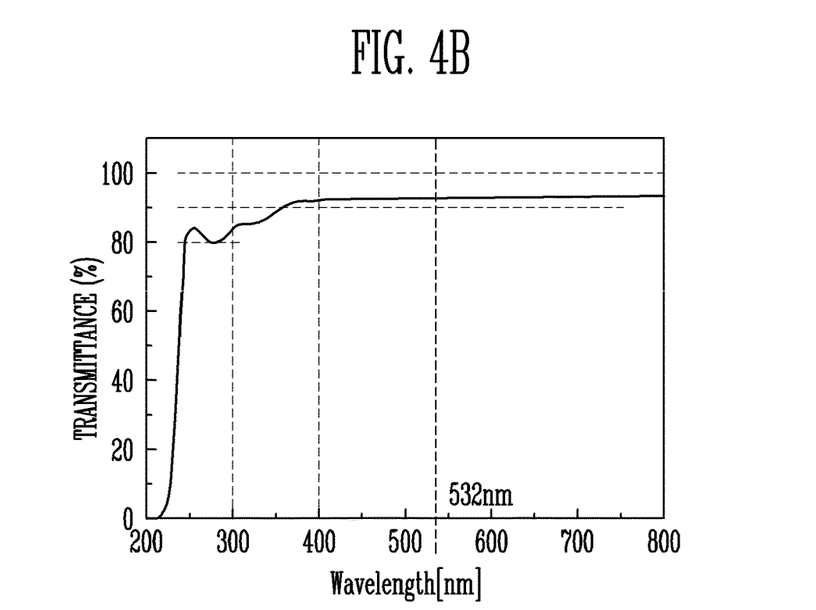
FIG. 4B is a graph illustrating changes in transmittance of a resin film with respect to wavelengths according to one or more exemplary embodiments.

FIG. 4B is a graph illustrating changes in transmittance of a resin film with respect to wavelengths according to one or more exemplary embodiments. The x-axis of the FIG. 4B shows a wavelength of a laser and the y-axis shows transmittance of the resin film.

Referring to FIG. 4B, a PVA-based resin film may exhibit maximum transmittance in a wavelength range of about 350 nm to about 600 nm. High transmittance in the resin film means that the generation of heat when a laser is transmitted through the resin film can be minimized.

If the femtosecond laser L having the above-described wavelength range is radiated onto the polarizer 10, partial energy is absorbed into the protective film 12 or 14, but most of the energy may be absorbed into iodine molecules. Accordingly, bonding between the iodine molecules can be broken, and separated iodine molecules are sublimated such that the transmission region 10a can be formed through decolorization.

Figure 5A:
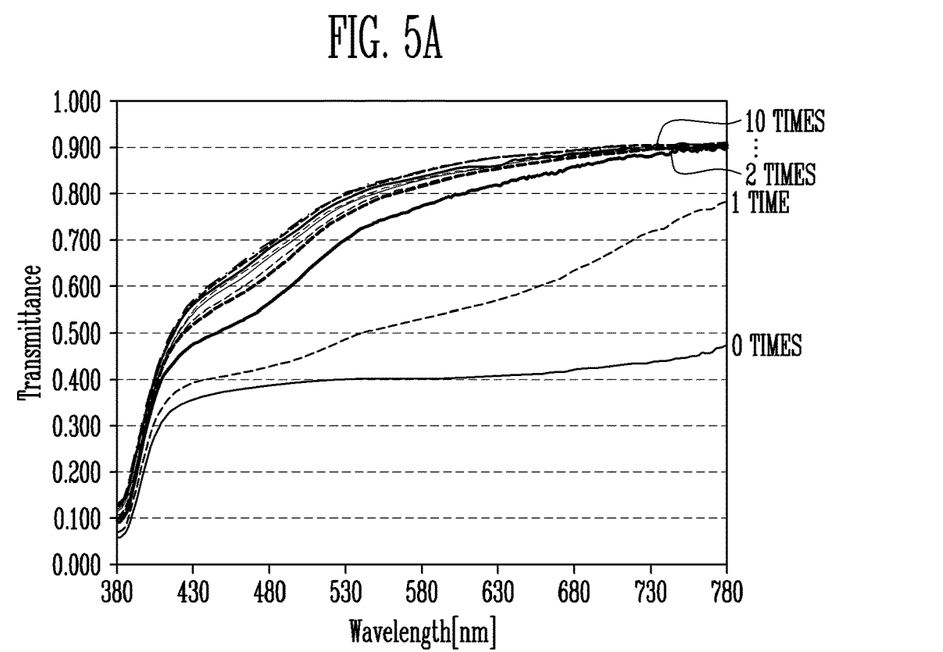
FIGS. 5A and 5B are graphs illustrating changes in group transmittance with respect to numbers of times of radiating a femtosecond laser in a visible light region according to one or more exemplary embodiments.
Figure 5B:
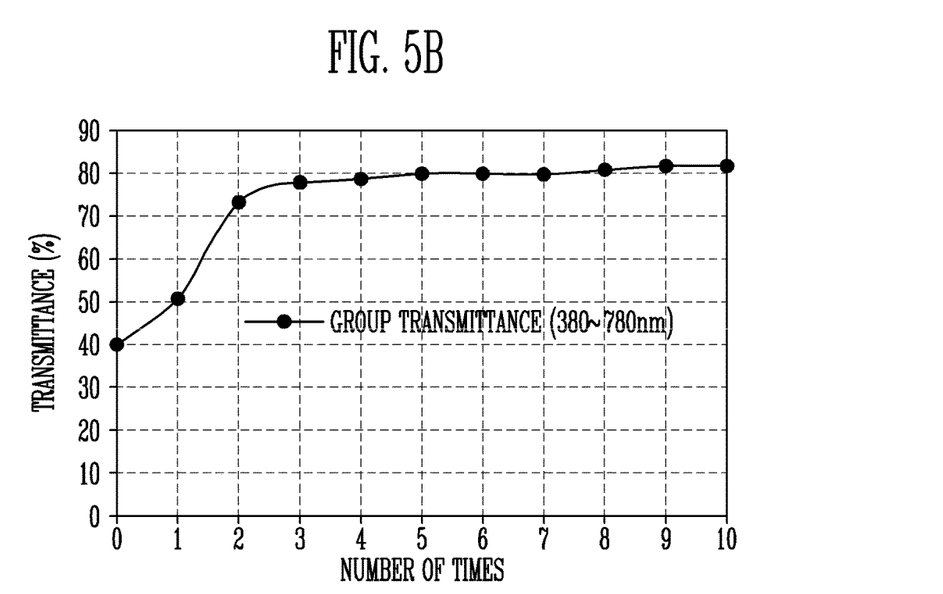

FIGS. 5A and 5B are graphs illustrating changes in group transmittance of the transmittance region 10a or 10a_1 with respect to a numbers of times of radiating the femtosecond laser L in a wavelength range of 380 nm to 780 nm, which is a visible light region, according to one or more exemplary embodiments. For convenience, FIGS. 5A and 5B will be described with respect to transmittance region 10a and polarizing plate 20.

The transmission region 10a having a group transmittance of 80% or so may be formed by radiating the femtosecond laser L one to ten times. When the femtosecond laser L is not radiated (e.g., radiated zero times), the group transmittance of a polarizing plate 20 is 40% to 45% or so. The transmittance region 10a having a group transmittance approximate to 80% may be formed by radiating the femtosecond laser L only once. It is noted, however, that in order to more consistently form the transmission region 10a having a group transmittance of 80% or more, the femtosecond laser L may be radiated two to ten times. Referring to FIG. 5B, it can be seen that a change in group transmittance changes less when the femtosecond laser L is irradiated three times or more.

In general, the polarizing plate 20 has a degree of polarization of 95% or more and a group transmittance of 40% to 45% or so in a majority of polarization regions. However, the polarizing plate 20 has a degree of polarization of 20% or less and a group transmittance of 80% or more in the transmission region 10a of which transmittance is changed through the above-described process. Accordingly, the transmittance region 10a having a low degree of polarization and a high transmittance is provided that, in turn, improves visibility.

Figure 6A:
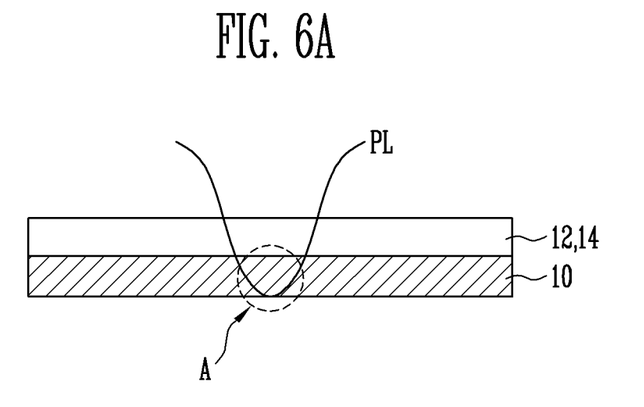
FIG. 6A is a sectional view of a polarizing plate illustrating a state in which a picosecond laser is radiated according to one or more exemplary embodiments.

FIG. 6A is a sectional view of a polarizing plate illustrating a state in which a picosecond laser is irradiated according to one or more exemplary embodiments.

When a picosecond laser PL having a pulse width larger than that of the femtosecond laser L is used, e.g., when a picosecond laser PL having a pulse width of 10 picoseconds (ps) to 50 picoseconds (ps) and a wavelength of 420 nm to 680 nm is radiated onto the polarizer 10, as shown in FIG. 6A, the protective film 12 or 14 at a portion through which a laser PL is transmitted in a relatively wide light concentration region A due to the thermal effect may be easily melted, or the polarizer 10 at a portion onto which the laser PL is radiated may be melted. That is, when an iodine molecule absorbs energy, the energy is transferred to another iodine molecule due to a relatively large pulse width (continued time), and, therefore, the group transmittance of an unwanted region is increased or the protective film 12 or 14 is melted, thereby resulting in a failure.

If the thickness of the polarizer 10 increases, the power of the picosecond laser PL is to be increased so as to sublimate the iodine molecules. However, if the power of the picosecond laser PL exceeds a certain level, e.g., 8 W or so, the above-described failure may occur due to high energy. On the other hand, when the thickness of the polarizer 10 is decreased to 5 µm or less, the above-described failure may easily occur under a power of 2 W or so.

However, according to one or more exemplary embodiments, the femtosecond laser L having a pulse width relatively smaller than the picosecond laser PL is used, and the conditions of the femtosecond laser L are controlled so that the above-described failure can be effectively prevented.

Figure 6B:
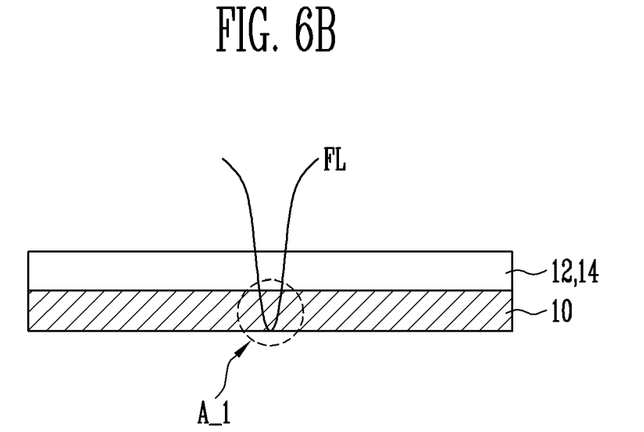
FIG. 6B is a sectional view of a polarizing plate illustrating a state in which a femtosecond laser is radiated according to one or more exemplary embodiments.

FIG. 6B is a sectional view of the polarizing plate illustrating a state in which a femtosecond laser is irradiated according to one or more exemplary embodiments.

Femtosecond laser FL is a laser that enables ultra-high radiation to be performed for a relatively short time of $\frac{1}{1,000}$ trillionth of a second ($10^{-15}$ second). As shown in FIG. 6B, the femtosecond laser FL has a light concentration region A_1 having a size much smaller than that of the picosecond laser PL and high energy, and is radiated for a relatively shorter time. Hence, the femtosecond laser FL can easily sublimate only iodine molecules in a desired region before a peripheral portion is melted due to a thermal effect, e.g., heat transfer. Accordingly, one or more exemplary embodiments may be applied even to the polarizer 10 having a thickness of 1 µm to 30 µm or so, or the polarizer 10 having a thickness of 30 µm or more.

Figure 7A:
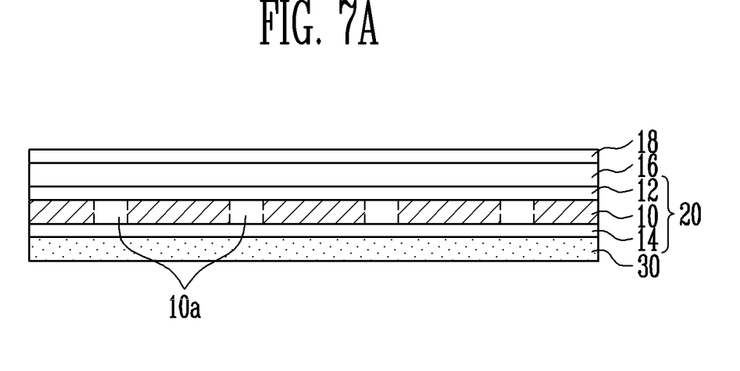
FIGS. 7A and 7B are sectional views illustrating polarizing plates at various stages of manufacture according to one or more exemplary embodiments.
Figure 7B:
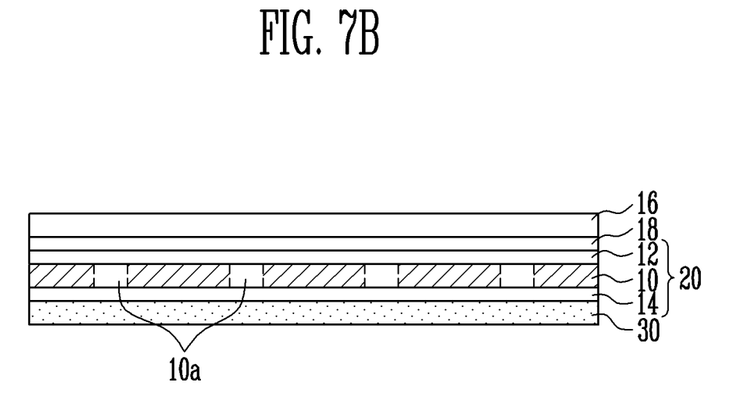

FIGS. 7A and 7B are sectional views illustrating polarizing plates at various stages of manufacture according to one or more exemplary embodiments. For convenience, FIGS. 7A and 7B will be described in association with the polarizing plate 20.

First, a polarizing plate 20 manufactured as described in association with FIGS. 1A to 1D is prepared.

Referring to FIG. 7A, a barrier film 16 and a surface treatment film 18 may be sequentially formed on a protective film 12 at one side of the polarizing plate 20, and an adhesive film 30 may be formed on a protective film 14 at the other side of the polarizing plate 20. In the structure in which the protective film 12 is formed on only one surface of a polarizer 10 as shown in FIG. 1B, the adhesive film 30 may be formed on the other surface of the polarizer 10.

The barrier film 16 may have a water vapor transmission rate (WVTR) of $10^{-2}$ g/m² per day or less and a transmittance of 90% or more. The barrier film 16 may be formed of an organic or inorganic material layer, or may be formed in a multi-layered structure of organic and inorganic material layers.

The polarizing plate 20 manufactured as described in association with FIGS. 1A to 1D may be weak to external humidity. When moisture penetrates into the polarizer 10, the group transmittance of a transmittance region 10a may be decreased due to diffusion of iodine molecules. As such, the barrier film 160 maintains a transmittance of 90% or more and blocks (or at least reduces) the penetration of moisture. Hence, in the polarizing plate 20 according to one or more exemplary embodiments, the transmittance of the transmission region 10a is not decreased and can be continuously maintained.

The surface treatment film 18 may include a functional layer, such as a hard coating layer, an anti-reflection layer, an anti-adhesion layer, an anti-diffusion layer, or an anti-glare layer. The surface treatment film 18 may be made of, for example, an acryl-based resin.

According to some exemplary embodiments, when the barrier film 16 is formed of a material having a low absorption coefficient of the femtosecond laser L, the transmission region 10a may be formed by radiating the femtosecond laser onto the polarizer 10 in a state in which the barrier film 16 is formed as shown by FIGS. 3A and 3B.

Referring to FIG. 7B, a polarizing plate 20 is first manufactured as described in association with FIGS. 1A to 1D. A surface treatment film 18 and a barrier film 16 may be sequentially formed on a protective film 12 at one side of the polarizing plate 20, and an adhesive film 30 may be formed on a protective film 14 at the other side of the polarizing plate 20. The surface treatment film 18 and the barrier film 16 have been described in association with FIG. 7A, and, therefore, duplicative descriptions will be omitted.

Since the barrier film 16 having a high transmittance and a high WVTR is disposed at the uppermost portion of the polarizing plate 20 as seen in FIG. 7B, the polarizing plate 20 can have improved reliability as compared with the structure of FIG. 7A.

Figure 8:
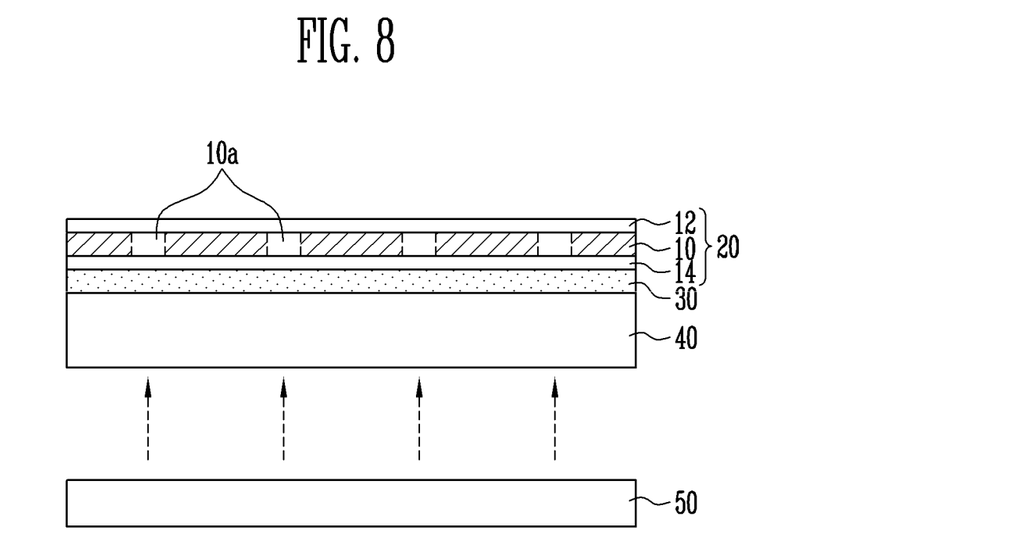
FIG. 8 is a sectional view illustrating a display device including a polarizing plate according to one or more exemplary embodiments.

FIG. 8 is a sectional view illustrating a display device including a polarizing plate according to one or more exemplary embodiments.

Referring to FIG. 8, the display device may include a polarizing plate 20, a liquid crystal display panel 40 disposed on the bottom of the polarizing plate 20, and a backlight unit 50 that provides light to the liquid crystal display panel 40. Although the backlight unit 50 is illustrated as being disposed below the liquid crystal display panel, it is contemplated that an edge-type backlight unit may be utilized and/or any other suitable light source.

The polarizing plate 20 may be attached to the liquid crystal display panel 40 by an adhesive film 30. Although a structure in which the polarizing plate 20 is disposed on an upper surface of the liquid crystal display panel 40 is illustrated in FIG. 8, the polarizing plate 20 may be disposed on a lower surface of the liquid crystal display panel 40. The polarizing plate 20 may be manufactured as described in association with FIGS. 1A to 1D and 7A or 7B.

The liquid crystal display panel 40 may include a plurality of pixels so as to display an image. For example, the liquid crystal display panel 40 may include pixels for displaying lights of red (R), green (G), blue (B), white (W), and/or the like. The liquid crystal display panel 40 may include a substrate on which a plurality of pixel electrodes corresponding to the respective pixels are formed, a substrate on which a common electrode is formed, and a liquid crystal layer interposed between the substrates. The plurality of pixel electrodes may be arranged, for example, in a matrix form between a plurality of gate lines and a plurality of data lines, thereby constituting a pixel array. The backlight unit 50 may be disposed on the bottom of the liquid crystal display panel 40, and may provide light to the liquid crystal display panel 40.

Figure 9:
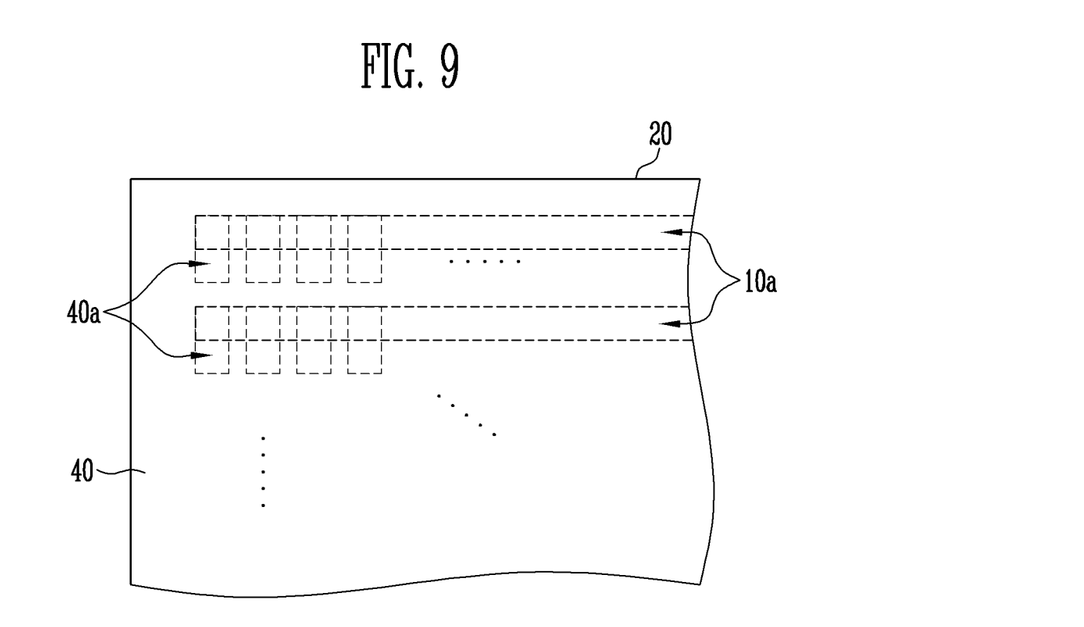
FIG. 9 is a plan view illustrating the display device of FIG. 8 according to one or more exemplary embodiments.

FIG. 9 is a plan view illustrating the display device of FIG. 8 according to one or more exemplary embodiments. It is noted that FIG. 9 illustrates an exemplary arrangement structure of the polarizing plate 20 and the liquid crystal display panel 40.

Referring to FIG. 9, the polarizing plate 20 may be disposed such that the transmission region 10a overlaps with at least some of the plurality of pixels 40a. The transmission region 10a of the polarizer 10 may overlap with 10% to 90% of a display region (opening) of each pixel 40a.

An electric field between the common electrode and the pixel electrode corresponding to each pixel 40a can be controlled according to a driving signal provided to the pixel array such that an arrangement direction of liquid crystals is controlled. In this manner, the transmittance of light provided from the backlight unit can be controlled to enable display of an image.

At this time, light displayed through the display region (opening) of each pixel 40a of the liquid crystal display panel 40 is emitted to the outside through the polarizing plate 20. In this case, since a portion (e.g., 50% or so) of the display region of each pixel 40a overlaps with the transmission region 10a of the polarizing plate 20, the visibility of the polarizing plate 20 can be improved by high group transmittance. That is, the visibility of the polarizing plate 20 can be improved as compared with conventional visibility while maintaining a degree of polarization, to which an image can be displayed.

In one or more exemplary embodiments, a liquid crystal display (LCD) is illustrated as an example, but exemplary embodiments are not limited thereto. For example, one or more exemplary embodiments may be applied to display devices, such as an electrophoretic display, an electrowetting display, a microelectromechanical (MEMS) display, an organic light emitting display, and/or the like.

According to one or more exemplary embodiments, a transmission region having a group transmittance of 80% or more is formed by selectively radiating a laser onto the polarizer in a process of manufacturing the polarizing plate. A femtosecond laser is used, and the pulse width and power of the laser are controlled so that only the transmittance of a desired region can be increased without melting the polarizer or the protective film. By applying the polarizing plate to a display device, the luminance and visibility of the polarizing plate can be improved by the transmission region, and a transparent display device can be easily implemented.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of manufacturing a polarizing plate, the method comprising:
    preparing a polarizer comprising a dichroic material, the polarizer being configured to polarize incident light;
    forming a protective film on at least one surface of the polarizer; and
    forming at least one transmission region by selectively radiating a femtosecond laser onto the polarizer, a group transmittance of the at least one transmission region being 80% or more.

2. The method of claim 1, wherein the dichroic material comprises at least one of iodine and an organic dye.

3. The method of claim 2, wherein preparing the polarizer comprises:
   preparing a polyvinyl alcohol-based resin film;
   stretching the resin film; and
   arranging iodine molecules and organic dye molecules in the stretching direction of the resin film by immersing the resin film in at least one solution comprising the iodine and the organic dye.

4. The method of claim 1, wherein the protective film comprises triacetyl cellulose.

5. The method of claim 1, wherein:
   a pulse width of the femtosecond laser is 100 femtoseconds to 500 femtoseconds; and
   a wavelength of the femtosecond laser is 350 nm to 600 nm.

6. The method of claim 1, wherein the femtosecond laser is radiated using a frequency of 100 KHz to 200 KHz and a power of 1 W or less.

7. The method of claim 1, wherein the femtosecond laser is radiated one to ten times in the at least one transmission region.

8. The method of claim 1, wherein a group transmittance of polarization regions of the polarizer excluding the at least one transmission region is 40% to 45%.

9. The method of claim 1, further comprising:
   forming a barrier film on the protective film.

10. The method of claim 9, wherein:
    a water vapor transmission rate of the barrier film is $10^{-2}$ $g/m^2$ per day or less; and
    a transmittance of the barrier film is 90% or more.

11. The method of claim 1, further comprising:
    forming a surface treatment film on the protective film; and
    forming a barrier film on the surface treatment film.

12. The method of claim 11, wherein the surface treatment film comprises an acryl-based resin.

13. The method of claim 11, wherein:
    a water vapor transmission rate of the barrier film is $10^{-2}$ $g/m^2$ per day or less; and
    a transmittance of the barrier film is 90% or more.

* * * * *